(12) United States Patent
Pollard

(10) Patent No.: X36
(45) Date of Patent: Dec. 30, 1791

(54) SPINNING COTTON

(76) Inventor: William Pollard

To the Honorable Thos Jefferson, Henry Knox, Edmd Randolph Esqrs.

The Representation & Petition of Willm Pollard of Philadelphia respectfully sheweth &c That your Petitioner about twelve months ago purchased a model of a machine for Ro-
ving & Spinning of Cotton at the expence of seven hundred pounds which was sold to him as
a model of Sir Richard Arkwrights machine and was brought into this country at the
risque of vessel & cargo & heavy amercements on the Captain besides imprisonment &c that
as soon as your Petitioner obtained it, he procured to be made a machine (on a small scale)
in just proportion in every respect to the said model but found it would not answer the
purpose in consequence of this he wrote to the person he had purchased the model from on the
8th of Decr last and informed him that your petitioner had made a machine after the
model but that it would not spin, and that he was confident some mistake had been made
either by the workman who made it or by design, but the Gentleman having obtained your
Petitioners Bond for the model without any reference to the consideration for which it was given
has not thought proper to favor your Petitioner with an answer but as he is informed has
assigned the Bond over to a third Person. Your Petitioner having been bred in part a man-
ufacturer & being some judge of Spinning &c of yarn made such alterations in the machine
from time to time as were consistent with his own Judgment & hath now brought a ma-
chine to perfection for the Roving and Spinning of Cotton; that the model he purchased is as
compleat as he received it and that of your Petitioner is also compleat both are ready for
inspection, the difference in them is visible and material. Your Petitioners machine may
be made to contain twenty spindles or twenty thousand if the steam or water or other
force which is to work them will carry that number and the mill house will contain
them In order to convey some idea of the importance of these machines your pe-
titioner begs leave to refer your board to a copy of a statement in Carys museum published in
Philada for Octr 1788, and which from his knowledge of Manchester Cotton goods he conceives
to be a reasonable statement it is as follows.

An account of the Cotton Mills in Great Britain & an Estimate of the Cotton Manufac-
tory of that Country.

One hundred and forty three cotton mills are now built & in progress in Great Brit-
ain of which nearly two thirds have been erected within these five years. Besides these
there are above 20,500 hand mills or Jennies for spinning the shute for the twisted yarn
spun by the water mills.

The expence of Water Mills is . . . . . . Stg $715.000

Expence of hand Jennies houses buildings & auxiliary machinery supposed at least . . . . . 255.000

The state of the raw materials & the progressive & astonishing increase of the manufacture will be best explained by what follows The Cotton & Wool applied to the manufacture was in } when manufactured supposed to be

| Year | lb | |
|---|---|---|
| 1781 | 5,101,920 | $2,000.000 |
| 1782 | 11,306.800 | 3,900.000 |
| 1783 | 9,546.179 | 3,200.000 |
| 1784 | 11,280.238 | 3,950.000 |
| 1785 | 17,992.888 | 6,900.000 |
| 1786 | 16,151.867 | 6,500.000 |
| 1787 | 22,600.000 | 7,500.000 |

From whence it appears that the cotton & wool applied to the hand and water machines in Great Britain in 1787 being 22.600.000 lb (worth in the raw state about $2,250.000 was worth when manufactured $7,500.000 yielding the immense profit to [illegible] & owners of the Mills & Factories of $5.250.000.

It may be observed in the foregoing statement that the Raw Cotton & Wool is valued at about 1/11 stg. pr. lb cotton can be purchased here from 18d. to 2/. pr. lb Curry and in the Southern States where young negroes & nearly [illegible] disabled Men & Women are at present a Burthen to their owners, they may in those Cotton mills be employed to advantage, and the same observation, may be extended to the poor white inhabitants in all our large towns, and your Petitioner conceives to a certain extent manufactures which can have the aid of such machines may be completed in this Country as low as in England. One girl or boy from eight to fourteen years of age will tend from 30 to 50 spindles, & it is necessary to have a man or woman to every ten children, to keep order no exertion of strength is required in the spinning apartment; It may be further observed on the connufactured is only a little more than 2/7; pr. lb weight and calicoes are worth from 6/ to 10/ stg.
pr. lb when finished & corded de Roys, Velvets, Velverets Jeans &c. are worth from 6/ to 9/ & mus-
lins from 6/ to 35/ stg. pr lb so that if the statement had been made on cotton Goods alone your
Petitioner conceives that the saving to the Country would have been much more considerable
Your Petitioner therefore prays that in consideration of the expence & trouble he hath been
at in procuring the model of the English Machine (which nevertheless proved in a great
degree useless) but more especially for the materials & effectual improvement & alterations made
& discovered by him so as to perfect a machine which promises such extensive advantages
to these United States & of which he is now ready to lay a model before your board together with
the model of the English Machine in order that the improvements and alterations may be
fully seen & understood, that your honorable board will be pleased to grant him his heirs
and assigns the sole and exclusive right and liberty of making constructing & using & of
vending to others to be used the said machine for fourteen years & in order to convince the
board that your petitioners wish is to encourage the using a machine of such consequence
to the Country & that he will not extort a high price pr. spindle he will submit to the
consideration of the Board the price pr spindle he shall demand after observing that the
price pr spindle of the machine which Sir Richard Arkwright obtained a Pattent for
was five guineas & although his Pattent is now expired your petitioner is well informed they
are still sold for one guinea pr Spindle & a Pattent has lately been granted in England to Messrs
Hendrew & Porthouse for a machine for spinning Flax & long combed wool these Gentlemen
sell their spindles at 22/ stg pr spindle and that brass work is higher here than in England And your Petitioner shall ever pray Wm Pollard Philadelphia June 29th 1790.

Patent Office May 25th 1836.

The above is a true Copy of Petition and Drawing

Henry L. Ellsworth
Superintendent

Exd. [illegible]

(Copy of Drawing made)

Recd & Recorded June 14, 1841.

(1353 words)

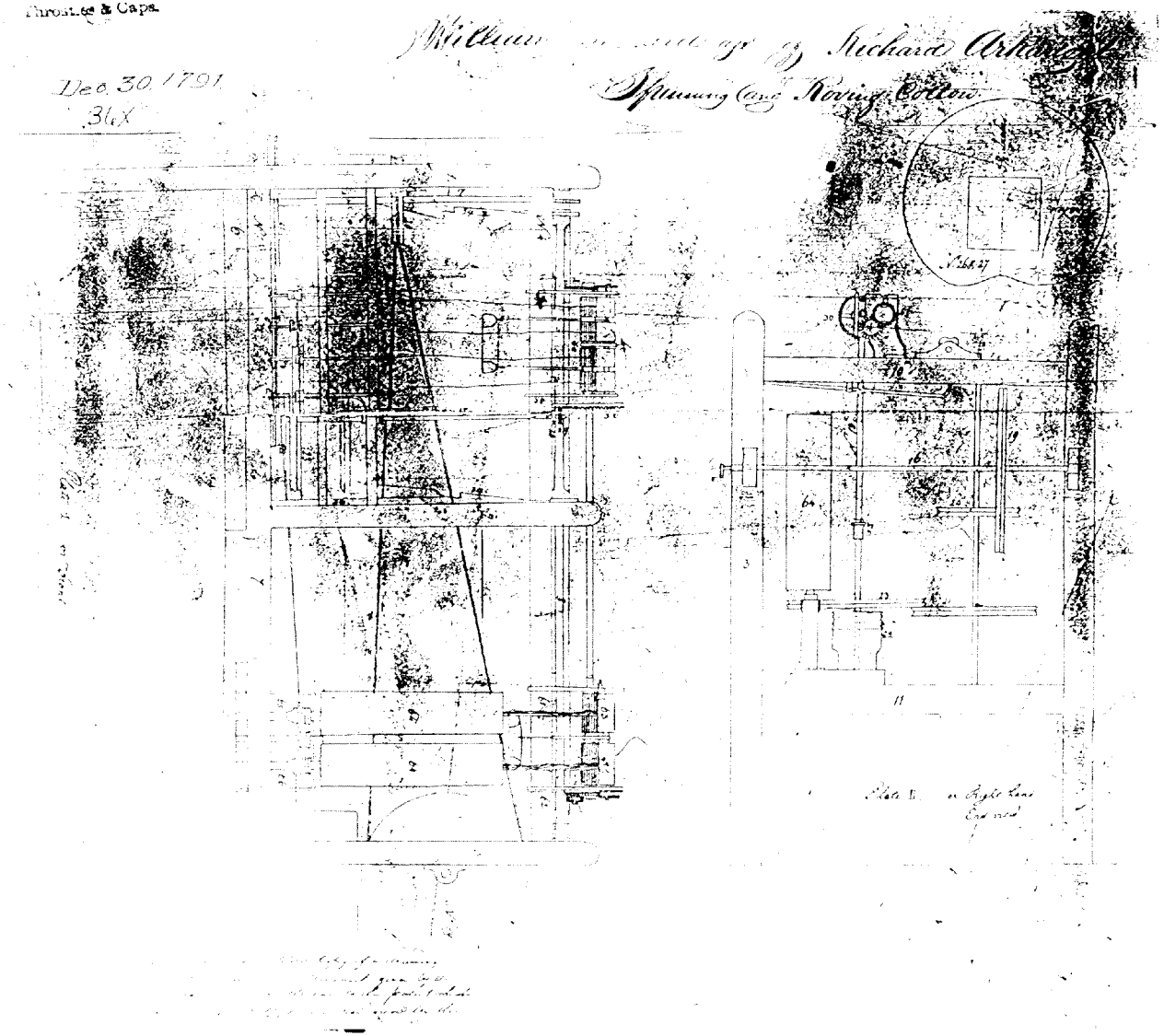

United States Patent
Patent No.: X36